Oct. 11, 1960   C. I. BURKE   2,955,378
ARTIFICIAL FISH LURES
Filed June 26, 1958

INVENTOR.
Charles J. Burke
BY
Louis Chayka
ATTORNEY 2,955,378
ARTIFICIAL FISH LURES Charles I. Burke, 717 Woodmere, Traverse City, Mich.

Filed June 26, 1958, Ser. No. 744,803

2 Claims. (Cl. 43—42.28)

The invention pertains to a fish lure having the form and coloring of specimens of small animal creatures such as angle worms, minnows, eels, and the like. The lures are made of a plastic material of a variety which is light enough to float in water and which is both resilient and easily flexible.

The object of the invention is to provide a lure of the kind described, but one which, when thrown into a body of water, such as a river or lake, will sink to the bottom of said body of water and will assume such a position that the head of the lure will be in contact with the bottom, while the body portion of the lure, because of its buoyancy, will assume an upwardly-slanting position. As a result thereof, the lure will have the appearance of probing the ground for food. The appearance will be enhanced if even a slight current of water would impart to the lure a waving movement, creating an illusion of life.

In order to cause the lure to assume this upwardly-slanting position, I have provided it with a sinker which is secured to the head portion of the lure but projects forwardly therefrom. The sinker is mounted upon the shank of a fishhook. The bill of the hook is partly imbedded in the head of the lure so that in appearance the sinker is but an extension of the head of the lure.

I shall now describe my improvement with reference to the accompanying drawings in which.

Similar numerals refer to similar parts throughout the several views.

The lure consists of two principal members, a body 10 and a sinker 11, the two members being joined by a fish hook which also serves as a carrier of the sinker.

The body 10 of the lure is made of a soft plastic material, such as polyvinyl chloride, and has the same yielding resiliency to the touch as a respective live creature which it simulates. This pertains also to the coloring of the respective specimen which imitates the natural coloring of the simulated creature. What is important is that the plastic be of a variety capable of floating in water. For this purpose the body may be made of a foamed plastic, which is a plastic expanded by gas and well known in trade, or the body may be made buoyant by being hollow.

Figure 1:
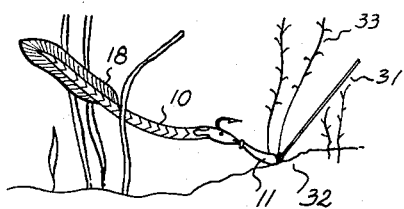
Fig. 1 is a side elevational view of the lure shown in a body of water, the drawings showing the lure with its head in contact with the ground, while the body of the lure slants upwardly from the ground.
Figure 2:
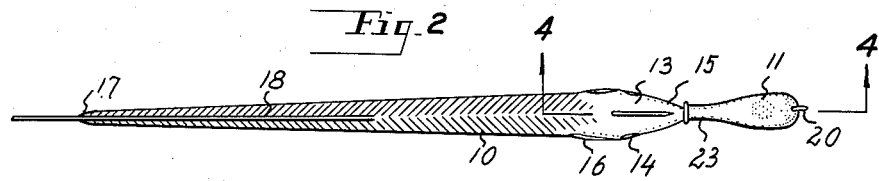
Fig. 2 is an enlarged top elevational view of the lure.
Figure 3:
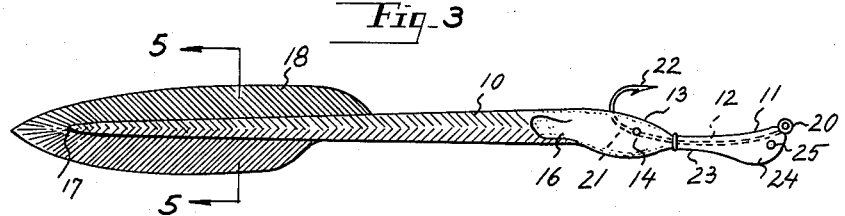
Fig. 3 is a side elevational view of said lure.
Figure 5:
Fig. 5 is a sectional view on line 5—5 of Fig. 3.
Figure 4:
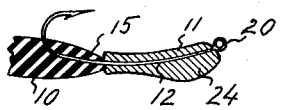
Fig. 4 is a sectional view on line 4—4 of Fig. 2.

The lure shown in Figs. 1 to 3 simulates a small eel. Its elongated body, which is circular in cross-section, includes at one end a bulbous head 13 which is provided with eyes 14. The head tapers into a snout 15 to which I shall refer again. Numeral 16 indicates simulated gills.

Beginning from the head, the body extends rearwardly, tapering gradually to a pointed end 17. Said end forms a part of a tail which is featured by a flat fin 18. The fin includes a portion extending upwardly from the body of the lure, a portion extending downwardly from said body, and a portion which extends rearwardly from the end 17, the three portions being integrally connected and having the form of the blade of a spear in which the tail portion of the body forms a shaft or stem. Normally the fin is disposed in a vertical plane.

The fish hook includes a shank 12 having at one end an eye 20, while the bill 21 of the hook is partly imbedded in the head 13. The outer end of the bill projects from the head upwardly and carries a barb 22.

Mounted upon the shank is a bulb-shaped sinker 11. Said sinker includes a constricted stem 23 which at its end bears against the end of the snout 15, and an expanded body 24 in which the center of gravity is located below said shank 12. This particular distribution of weight in the sinker is important, as it results in holding the body of the lure in a life-like position in which the fin 18 will be in a vertical plane. Numeral 25 indicates a bead simulating an eye.

Figure 6:
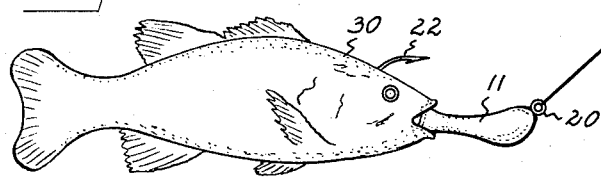
Fig. 6 is a side elevational view of a modified lure.

The lure shown in Fig. 6 is made in the form of a fish 30, but includes the same sinker 11 which is mounted upon the shank of a fish hook, the bill of the hook being partly imbedded in the head of the fish but protruding therefrom. Numeral 31 indicates a fish line secured to the eye 20 of the hook.

The position of the lure when cast into the body of water, such as a lake, is shown in Fig. 1 where the sinker 11 is shown resting on the bottom 32 of the body of water. Numeral 33 shows weeds or similar vegetable growth. The position of the body of the lure extending at an angle from the bottom 32 illustrates what would be the normal position of the lure when the sinker rests on said bottom. The flat tail offers a broad surface whereby the body of the lure may be flexed by movement of water in which the lure is immersed.

After having described my improvement, what I wish to claim is as follows:

1. A fish lure simulating a live creature, the lure comprising a thin elongated body which is flexible and buoyant in water, said body being substantially circular in cross section and including a thick, integrally formed head but gradually tapering in thickness from said head to a pointed rear portion, the body at said rear portion being provided with a flat tail, disposed in a vertical plane and including a portion extending radially upwardly from the body, a portion extending rearwardly therefrom and a portion extending downwardly from said body, all said portions forming a continuous structure, a fish hook having a bill portion and a shank terminating with an eyelet for attachment to a fish line, the bill portion of the hook being partly imbedded in the head but having a barbed end portion protruding from said head, the hook, including the shank and the bill portion, being disposed in the same plane as the flat tail, the shank extending forwardly from the head, and a bulbous sinker embracing the shank and extending from the head of the lure forwardly to said eyelet.

2. A fish lure having the form simulating an elongated live creature, the lure having a flexible body buoyant in water and including a head extending forwardly therefrom, the body of the lure being substantially circular in cross section and tapering from the head rearwardly to a pointed rear end portion, said body being provided with a flat tail disposed in a vertical plane and forming a continuous fin beginning at a point midway the length of said body, and including a portion extending upwardly from said body, a portion extending rearwardly therefrom and a portion extending downwardly therefrom; a fish hook having a bill portion and a shank terminating with means for attachment to a fishline, the bill portion of the hook being partly imbedded in the head but having a barbed end portion protruding from said head, while the shank extends forwardly of the head, a bulbous metal sinker mounted upon the shank and abutting the front end of the head to form a simulated continuation thereof, the center of gravity of the sinker being located in an off-side relation to the shank to keep the hook in a vertical plane while the lure is in a stationary position in a body of water.

References Cited in the file of this patent

UNITED STATES PATENTS

| | | |
|---|---|---|
| 1,295,370 | Porter | Feb. 25, 1919 |
| 1,846,538 | Albers et al. | Feb. 23, 1932 |
| 2,007,045 | Francis | July 2, 1935 |
| 2,572,608 | Gabor | Oct. 23, 1951 |
| 2,691,841 | Daniel | Oct. 19, 1954 |
| 2,765,572 | Woolfe | Oct. 9, 1956 |
| 2,820,314 | Scott | Jan. 21, 1958 |